Sept. 30, 1969 C. F. RICE ET AL 3,470,322

COMBINATION CONFERENCE CONNECTION AND CALL TRANSFER
DEVICE FOR TELEPHONE SUBSCRIBER LINES

Filed Aug. 12, 1966

INVENTORS.
CHARLES F. RICE
CHARLES KIMTANTAS
BY E. H. Schmidt
ATTORNEY.

United States Patent Office 3,470,322

Patented Sept. 30, 1969

3,470,322

COMBINATION CONFERENCE CONNECTION AND CALL TRANSFER DEVICE FOR TELEPHONE SUBSCRIBER LINES

Charles F. Rice, 812 NE. 92nd St., Miami Shores, Fla. 33153, and Charles Kimtantas, 549 Palmetto Drive, Miami Springs, Fla. 33166

Filed Aug. 12, 1966, Ser. No. 572,045
Int. Cl. H04m *3/42*
U.S. Cl. 179—1 9 Claims

ABSTRACT OF THE DISCLOSURE

A conference connection and call transfer device for effecting call transfer or conference connection between two or more mutually remote telephone subscribers at a subscriber station having a plurality of telephone circuit subscriber lines, and having universal application to all types of telephone signalling exchange systems including step-by-step, cross-bar and solid state. The lines are inductively coupled by means of a transformer having a winding for each of the lines to be coupled. Coupling is effected through a series-connected, bi-directional triode switch in each line circuit, whereby automatic disconnect is effected upon hanging up of the associated telephone subscriber set. Manual switch means is provided for switching a controlling telephone hand-set from the seized line to another line, at which time the transformer winding associated with the seized line serves as a terminal impedance for the line matching that of a hand-set to keep the line seized.

Figures 1, 2, 3:
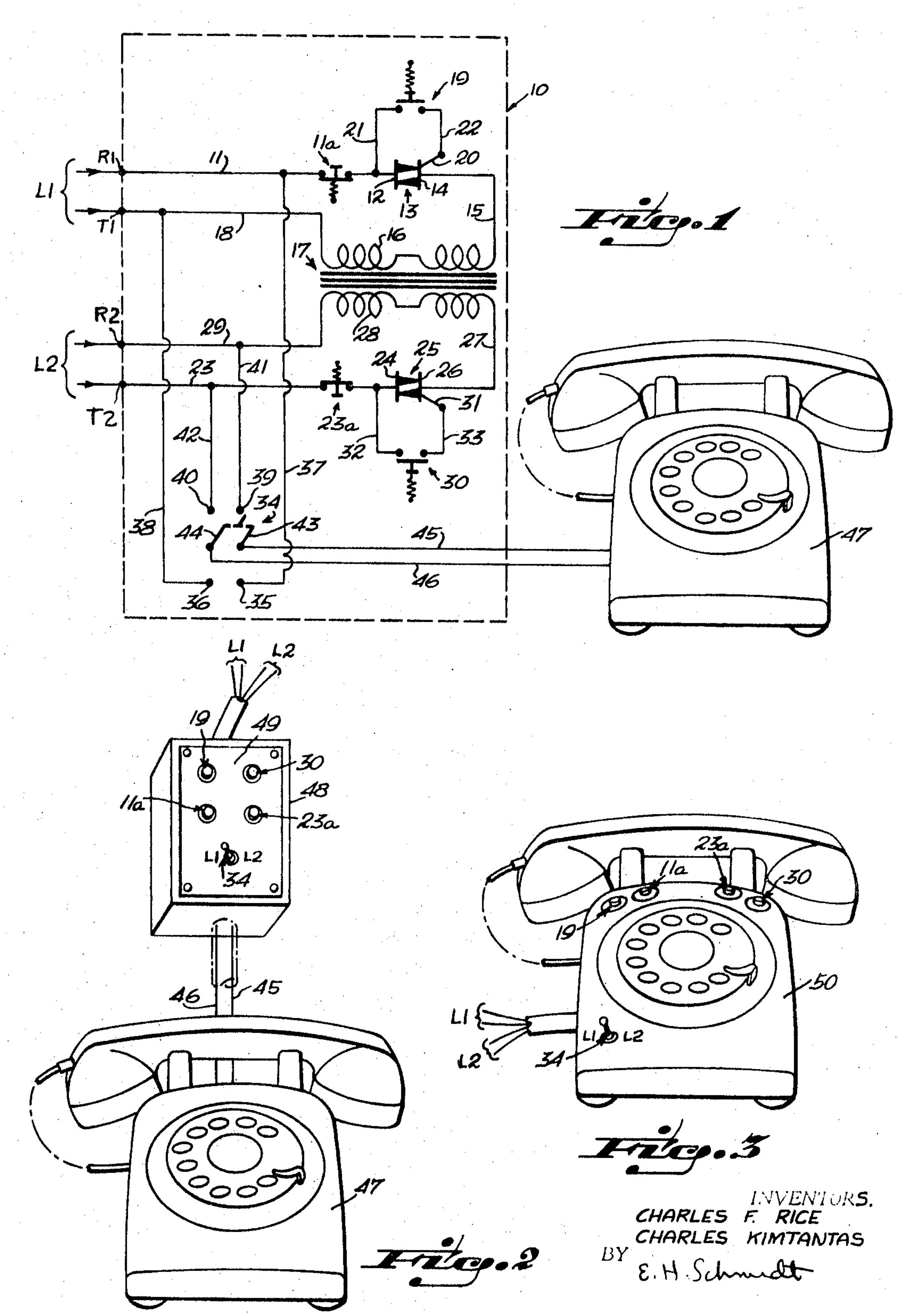

This invention relates to telephone control circuitry and is directed particularly to a device for effecting call transfer or conference connection between two or more mutually remote telephone subscribers at a subscriber staton having a plurality of telephone circuit subscriber lines.

The principal object of the invention is to provide a conference connection and control device that enables a subscriber at the controlling station to make successive outgoing calls to persons at a plurality of mutually remote stations to bring them into conference connection with him and others at the remote stations.

Another object of the invention is to provide a device of the character described which can be used at a subscriber station having at least two incoming lines to transfer a call received or made on one line, through the second line, to be answered at a remote subscriber station.

Still another object is to provide a combination conference connection and call transfer device for telephone subscriber lines that includes means at the controlled station for holding an incoming call or called line indefinitely, even while the telephone receiver set circuitry is switched out of the line such as occurs when dialing out a second line, or when it is desired to talk privately with a remote subscriber answering or calling in on the second line.

Yet another object is to provide a combination conference connection and call transfer device of the character described which automatically corrects for polarity reversal between two or more interconnected lines.

Still another object is to provide a combination conference connection and call transfer device of the character described which will be operative to automatically disconnect a "seized" subscriber line in conference or call transfer connection immediately upon the remote subscriber hanging up, and which further includes means for the controlling subscriber to disconnect the "seized" line, when desired, simply by pressing a switch button.

Another object is to provide a combination conference connection and call transfer device of the character described which will be compact, simple to install and operate, and dependable in use.

Other objects, features and advantages of the invention will be apparent from the following description when read with reference to the accompanying drawings.

In the drawings, wherein like reference numerals denote corresponding parts throughout the several views:

FIG. 1 is a schematic diagram of a combination conference connection and call transfer device embodying the invention;

FIG. 2 illustrates the conference connection and call transfer device in a separate housing and interconnected between two telephone subscribers lines and a standard single line telephone set; and FIG. 3 illustrates a telephone handset equipment with two subscriber lines and having the circuitry of the conference connection and call transfer device embodying the invention housed in the telephone base structure.

Referring now in detail to FIG. 1 of the drawings, the broken line box indicated at 10 encompasses the internal circuitry, shown schematically, of our device, and the same having a plurality (two in the embodiment illustrated) of ring and tip line pairs R1, T1 and R2, T2, respectively, externally connected, correspondingly, to the ring and tip leads of telephone subscriber lines L1 and L2 available for conference or call transfer connection at the controlling subscriber station. Line ring terminal R1 of line L1 is connected, as by conductor 11, through normally-closed push-button switch 11*a* to the second main terminal (2), designated by reference numeral 12 of a bi-directional triode switch (silicon controlled rectifier) 13. The first cathode terminal (1), designated by reference numeral 14 of the switch 13 is connected, as by conductor 15, to one terminal of one winding 16 of a telephone repeat coil or transformer 17 having two coils of one-to-one turns ratio. The other terminal of repeat coil winding 16 is connected, as by conductor 18, to remaining terminal T1 of telephone L1. A normally-open, momentary-contact push-button switch 19 is connected across second main terminal (2), designated by reference numeral 12 and trigger or gate element 20 of the bi-directional triode 13 as by conductors 21, 22.

Line tip terminal T2 is connected, as by conductor 23, through normally-closed push-button switch 23*a* to the second main terminal (2), designated by reference numeral 24 of a second bi-directional triode switch 25. The first cathode terminal (1), designated by reference numeral 26 of the switch 25 is connected, as by conductor 27, to one terminal of the second winding 28 of the telephone repeat transformer 17. The remaining terminal of repeat coil winding 28 is connected, as by conductor 29, to remaining terminal R2 of telephone line L2. A normally-open, momentary-contact push-button switch 30 is connected across second main terminal 24 and trigger or gate element 31 of the bi-directional triode 32 as by conductors 32, 33.

Means is provided for switching a telephone set for selective connection to either one or the other of the two telephone subscriber lines L1 and L2 at the controlling subscriber station. To this end, a double-pole, double-throw switch 34 is provided. Fixed switch contacts 35, 36 of the switch 34 are connected, as by conductors 37, 38, to terminals R1 and T1, respectively, of L1, and fixed switch contacts 39, 40 of said switch are connected, as by conductors 41, 42, to terminals R2 and T2, respectively, of line L2. Movable switch arms 43, 44 of the double-pole double-throw switch 34 are connected to the input terminals 45, 46 of an ordinary telephone set 47. It will be understood that when the ganged movable switch arms 43, 44 are moved into contact with fixed switch contact pair 35, 36, the telephone set 45 will be connected across line L1 through conductors 37, 38; and that when said switch arms are moved into contact with fixed switch contact pair 39, 40, the telephone set will be connected across line L2 through conductors 41, 42.

The above described circuitry embodying our combination conference connection and call transfer device may be housed in a separate equipment container or box 48, as illustrated in FIG. 2, with the push buttons 19, 30, 11*a*, 23*a* and double-pole double-throw switch 34 mounted in a panel 49 for manual control. Alternatively, the circuitry, which includes only a few small components, could be housed within the base structure of a telephone set 50, as illustrated in FIG. 3, with the push buttons 19, 30, 11*a*, 23*a* and the double-pole double-throw switch 34 mounted in the face panel thereof.

Considering now the operation of the inveniton as a conference connection device and referring, by way of example, to the embodiment of FIGS. 1 and 2, the telephone 47 will be employed in the ordinary fashion to make a call to the first remote station to be called into conference, through line L1, for example, the line switch 34 first being thrown to L1 position, as shown in FIG. 2 to establish a direct connection between said line and the telephone set. At this time the bi-directional triode switch 13 will be in open-circuit condition, permitting no current to flow through the repeat transformer coil 16 in series with said bi-directional triode switch, and the normally closed switch 11*a* and telephone subscriber line L1. When the first called subscriber answers, he will be told to wait while the second subscriber is called into conference connection. Before switching line switch 34 to the second line at the controlling station, push button 19 associated with telephone line L1 will be depressed to apply a trigger voltage (D.C. talk voltage from the telephone line L1) to the bi-directional triode switch 13. This voltage, which can be of either polarity because of the bi-directional nature of the triode switch 13, will, in effect, close-circuit the device so that telephone line current of line L1 will flow from one conductor of the line through conductor 11 normally closed push button switch 11*a*, switch 13 and repeat transformer winding 16 through conductor 18 to the other conductor of the line L1. The transformer winding 16 reflects an impedance which substantially matches that of a subscriber line, with or without the usual telephone handset equipment connected in parallel therewith, so that the called line can be held or will remain "seized" while the person at the controlling station makes the second call through line L2 to bring the second remote subscriber into conference connection, after first having switched the line switch 34 to closed circuit position with respect subscriber line L2. It will be noted that since the bi-directional triode switch 25 will normally be in open-circuit condition, no talking current will flow through the second winding 28 of the repeat transformer 17, and, consequently, the controlling party can talk in privacy with the second remote party called. To effect conference connection, it is only necessary now for the controlling subscriber to depress the push button switch 30 momentarily, whereupon, as detailed above in connection with the circuitry directly associated with line L1, talking current will now flow through said second winding to repeat in winding 16 to be heard by the remote subscriber being held on line L1 by virtue of said line being connected across said winding 16. Thus all three parties can converse with one another in conference connection, irrespective of the polarities or mutual polarities of the two lines being interconnected in conference connection, the bi-directional triode switches being capable of being actuated by trigger voltages of either polarity, if direct current, and by alternating currents, and being capable of passing voice frequency alternating currents with no appreciable attenuation when in closed-circuit actuated condition.

While the invention is illustrated and described herein as operating with two remote subscriber's lines for bringing two remote parties in conference connection with the controlling subscriber, it will be understood that the device could also be used with three or more lines at the controlling station for bringing into conference a like number of remote subscribers simply by using an additional winding on the repeat transformer for each additional line, together with associated bi-directional triode switch circuitry as described above.

It is to be noted that instead of the subscriber at the controlled station initiating the conference connection by first calling out through one of the lines, an incoming call could as well effect the first step in conference connection. Further, instead of setting up conference connection, an incoming call can be transferred to a remote party through the second line without even conversing with the calling party, it only being necessary for the operator at the controlling subscriber station to dial out through the second line to the remote station where the party being called is known or thought to be, while holding the incoming call line, and then, after establishing that the called party is on the second line, effecting interconnection by pushing push-button switch 30, for example, if the party called is on line L2. At this point the circuitry is set up in conference connection, but since conference was not the purpose of the incoming call, the operator will merely hang up his receiver, leaving the two parties at the two remote stations to carry out their conversation in privacy and, if desired, without the first party calling in even being aware that the called party is not at the location of his subscriber line, but may be at any other subscriber station in the telephone system.

It will be noted that when either remote line is in use or "seized" after a call having been received or made at the controlling station, and after having actuated the associated triggering push button switch 11 or 30, the line will ordinarily remain seized and in conference connection until the person at the remote station hangs up. Upon hanging up, deactuation of the associated bi-directional triode switch is effected by polarity reversal of line potential, or momentary open-circuiting of the line at the telephone equipment office (bringing line potential to zero momentarily) depending upon what system of telephone circuitry is employed in association with the subscriber lines. In either case, potential across the associated bi-directional switch is brought through zero to open-circuit the switch.

In order to prevent tying up a line by a remote party inadvertently leaving the telephone hand-set off its cradle, and in order to disconnect a seized line from conference connection if brought into conference connection by accidently depressing its associated triggering circuit switch, disconnect switches 11*a* and 23*a* are provided in series with the line control circuitry. Upon pressing either of said switch buttons, potential across its associated bi-directional switch is brought to zero, whereupon it will become deactivated or open-circuited again.

While we have described and illustrated herein only one particular example of circuitry found suitable in the practice of our invention, it is to be understood that this circuitry is presented by way of example only, and not in a limiting sense. The invention, in brief, comprises all the modifications and embodiments coming within the scope and spirit of the following claims.

What we claim as new and desire to secure by Letters Patent is:

1. In a combination telephone conference connection and call transfer device for use at a telephone subscriber station having a plurality of subscriber lines thereto from a telephone system exchange, and a telephone set equipment, the combination comprising, transformer means for inductively coupling said subscriber lines and having a plurality of electrical windings, one for each of said subscriber lines, circuit means for each of said subscriber lines for interconnecting said subscriber lines in series with one each of said plurality of windings, normally non-conductive solid state switch means having first and second main terminal elements in series with each of said circuit means and having a gate terminal element responsive to potential applied to said gate terminal element with respect to said second main terminal element for rendering said switch means conductive when a potential appears across said first and second main terminal elements, said switch means including means rendering it non-conductive upon a potential across said first and second main terminal elements falling either to or through zero potential.

2. A combination telephone conference connection and call transfer device as defined in claim 1 including a normally-open, manually-operated electrical switch connected across said second main terminal and gate terminal elements of each of said switch means for applying associated line potential thereacross for rendering said switch means conductive.

3. A combination telephone conference connection and call transfer device as defined in claim 2 including a normally-closed, manually-operated electrical switch connected in series with one each of said circuit means for rendering said switch means non-conductive.

4. A combination telephone conference connection and call transfer device as defined in claim 3 wherein said normally-open and normally-closed manually-operated switches are momentarily actuated push-button switches.

5. A combination telephone conference connection and call transfer device as defined in claim 4 wherein said inductive coupling means comprises a one-to-one turns ratio two winding repeat transformer.

6. A combination telephone conference connection and call transfer device as defined in claim 2 wherein said switch means comprises a bi-directional triode switch.

7. A combination telephone conference connection and call transfer device as defined in claim 6 including a normally-closed manually-operated electrical switch connected in series with one each of said circuit means for rendering said switch means non-conductive.

8. A combination telephone conference connection and call transfer device as defined in claim 7 wherein said normally-open and normally-closed manually-operated switches are momentarily actuated push-button switches.

9. A combination telephone conference connection and call transfer device as defined in claim 8 wherein said inductive coupling means comprises a one-to-one turns ratio two winding repeat transformer.

References Cited

UNITED STATES PATENTS 3,381,226 4/1968 Jones et al. ---------- 307—252
3,389,224 6/1968 Shaw ---------------- 179—1

OTHER REFERENCES

General Electric Company—Notes on the Application of the Silicon Controlled Rectifier—December 1958, pp. 28, 29.

KATHLEEN H. CLAFFY, Primary Examiner
J. S. BLACK, Assistant Examiner

U.S. Cl. X.R.

179—18; 307—252